United States Patent
Jaumann et al.

(10) Patent No.: US 7,878,465 B2
(45) Date of Patent: Feb. 1, 2011

(54) TRIPOD HEAD

(75) Inventors: Leonhard Jaumann, Munich (DE); Berthold Mollenhauer, Munich (DE)

(73) Assignee: Camera Dynamics GmbH, Eching (DE)

(*) Notice: Subject to any disclaimer, the term of this patent is extended or adjusted under 35 U.S.C. 154(b) by 336 days.

(21) Appl. No.: 12/080,988

(22) Filed: Apr. 8, 2008

(65) Prior Publication Data

US 2008/0258022 A1    Oct. 23, 2008

(30) Foreign Application Priority Data

Apr. 17, 2007   (DE) .................. 10 2007 018 029

(51) Int. Cl.
  *F16M 11/02*   (2006.01)
(52) U.S. Cl. .................. 248/178.1; 248/179.1; 396/428
(58) Field of Classification Search ............ 248/566, 248/562, 608, 609, 178.1, 179.1, 186.2, 176.3; 267/154, 69; 396/419, 428
  See application file for complete search history.

(56) References Cited

U.S. PATENT DOCUMENTS

| | | | |
|---|---|---|---|
| 1,898,469 A | | 2/1933 | Tonsor |
| 2,882,001 A | | 4/1959 | Ries et al. |
| 3,552,699 A | | 1/1971 | Baker |
| 4,226,303 A | | 10/1980 | Thoma |
| 4,447,033 A | | 5/1984 | Jaumann et al. |
| 4,955,568 A | | 9/1990 | O'Connor et al. |
| 5,267,712 A | * | 12/1993 | Shen .................. 248/179.1 |
| 6,027,257 A | * | 2/2000 | Richards et al. ............ 396/428 |
| 6,714,249 B2 | * | 3/2004 | May et al. .................. 348/373 |
| 7,473,040 B2 | * | 1/2009 | Kenoyer et al. ............ 396/428 |
| 2003/0128975 A1 | * | 7/2003 | Shevick .................. 396/428 |
| 2006/0269278 A1 | * | 11/2006 | Kenoyer et al. ............ 396/428 |

FOREIGN PATENT DOCUMENTS

| | | |
|---|---|---|
| DE | 76 18 433 U1 | 10/1976 |
| DE | 30 26 379 A1 | 2/1982 |
| GB | 2 080 406 A | 2/1982 |
| GB | 2 190 703 A | 11/1987 |
| GB | 2 371 283 A | 7/2002 |
| WO | WO 2006/018011 A1 | 2/2006 |

OTHER PUBLICATIONS

Search Report mailed Jul. 9, 2009 for European Patent Application No. 08152516.4.

* cited by examiner

*Primary Examiner*—Alfred Joseph Wujciak, III
(74) *Attorney, Agent, or Firm*—Wolf, Greenfield & Sacks, P.C.

(57) ABSTRACT

Tripod head for pivotably receiving a device, in particular a film or television camera, comprising a housing (10), a shaft (15) which is rotatably mounted in the housing (10), a receptacle (16, 17), which is connected to the shaft (15), for the device, at least two separate energy accumulators (21-25) which are respectively disposed between the shaft (15) and the housing (10), and a compensating comprising a respective interlocking (31-35) for the energy accumulators in order to switch the energy accumulators (21-25), in each case in operative connection between the housing (10) and shaft (15), so that a restoring moment is exerted on the receptacle (16, 17) via the shaft (15) in accordance with the torque of the device, and a common actuating element (46) in order to switch the energy accumulators (21-25) via the interlocking (31-35) individually or in combination, as desired, characterised in that the actuating element (46) is configured as a rotary disc and comprises on the side facing the housing a cam controller (50, 51) which acts on the interlocking means (31-35) in such a way that the energy accumulators (21-25) can be switched via the interlocking means (31-35) individually or in combination, as desired.

9 Claims, 2 Drawing Sheets

TRIPOD HEAD

FIELD OF THE INVENTION

The present invention relates to a tripod head for pivotably receiving a device, in particular a film or television camera, comprising a housing, a shaft which is rotatably mounted in the housing, a receptacle, which is connected to the shaft, for the device, at least two separate energy accumulators which are respectively disposed between the shaft and the housing, and a compensating means comprising a respective interlocking means for the energy accumulators in order to switch the energy accumulators, in each case in operative connection between the housing and shaft, so that a restoring moment is exerted on the receptacle via the shaft in accordance with the torque of the device, and a common actuating element in order to switch the energy accumulators via the interlocking means individually or in combination, as desired. The term 'pivotable' refers, in relation to the present invention, to pitching of the device, i.e. a swivelling movement about a substantially horizontal axis.

BACKGROUND OF THE INVENTION

A tripod head mentioned at the outset is previously known, inter alia, from DE 30 26 379 A1. The tripod head described therein has as its general actuating element a central rotary ring which is disposed around the cylindrically configured housing of the tripod head disclosed therein. Control cams, which act on locking pins as interlocking means, are configured on the inner circumferential surface, facing the housing, of the central actuating ring. The interlocking pins are disengaged from the energy accumulator by a compression spring, i.e. the operative connection between the housing and shaft is cancelled. If a control cam enters into engagement with one of the locking pins, the locking pin is pressed against the spring force in the direction of the energy accumulator and, in the case of a corresponding orientation in the neutral position (balanced position), the locking pin enters into engagement with a depression in the energy accumulator in order to establish the operative connection. However, the control cam is able fully to slide via the locking pin only in this position, as only in this position can the complete stroke of the locking pin, which is otherwise pressed against the outer circumferential surface of the respective energy accumulator, be carried out.

This embodiment has the drawback that, on the one hand, the actuating ring greatly restricts the configuration of the outer shape of the housing and the linking thereof to the tripod because at least one central portion has to be completely cylindrical. Furthermore, this can result in an increase in the overall height of the tripod head. On the other hand, the actuating ring must sit centrally above the energy accumulators and thus extend at least partially below the receptacle. It can therefore be difficult to handle.

Finally, it is a drawback of the foregoing embodiment that the locking pins are pressed by the control cams into engagement with depressions in the energy accumulators. In order for this process to proceed in a frictionless manner, only low tolerances are admissible. In addition, it is possible to bring the central rotary ring into its corresponding switching position only if the locking pins can also engage with the depressions 19, i.e. are oriented toward said depressions, so that optimum and simple handling of the actuating ring is not ensured and the low tolerances push up the production costs.

Finally, the central actuating ring is a relatively large component and thus accounts for a significant part of the weight of the tripod head and also the costs thereof.

SUMMARY OF THE INVENTION

In view of the foregoing discussion, an object of the present invention is to develop the tripod head mentioned at the outset in such a way that the freedom of design of the outer contour of the housing is increased and the tripod head is more compact, lighter and more cost-effective to manufacture and also simpler to handle.

Accordingly, the present invention proposes a tripod head for pivotably receiving a device, in particular a film or television camera, the aforementioned swivelling movement being in the form of pitching of the device, i.e. a swivelling movement about an axis extending substantially horizontally. The tripod head according to the invention comprises a housing which is generally to be mounted on a tripod so as to be able to rotate about a vertically extending axis, a shaft which is rotatably mounted in the housing and a receptacle, which is connected to the shaft, for the device. It is in this regard immaterial whether the receptacle for the device is connected to the shaft directly or indirectly. All that matters is that the receptacle be rotatable about the axis in order to allow the swivelling movement and thus the pitching of the device. According to the invention, at least two separate energy accumulators are respectively disposed between the shaft and the housing. These energy accumulators are preferably torsion springs and more preferably torsion springs of the type comprising an inner ring and an outer ring between which a resilient material which produces the spring force is provided. On the other hand, the use of one or two helical springs between the inner and outer rings is also conceivable. With regard to the configuration of the torsion springs, a person skilled in the art may refer to DE 30 26 379 A1 which was mentioned at the outset. Furthermore, the invention provides a compensating means comprising a respective interlocking means for each of the energy accumulators in order to switch the energy accumulators, in each case in operative connection between the housing and shaft, so that a restoring moment is exerted on the receptacle via the shaft in accordance with the torque of the device. According to a preferred embodiment and using the above-mentioned torsion springs, the inner ring is attached non-rotatably, for example via a tongue-and-groove connection, on the shaft and the interlocking means engages with an engagement portion, for example a depression, in the outer ring of the torsion spring for establishing the operative connection between the housing and shaft. Furthermore, the compensating means of the tripod head according to the invention has a common actuating element in order to switch the energy accumulators via the interlocking means individually or in combination, as desired. It is in this regard in the first place immaterial whether the actuating element respectively engages the interlocking means with the energy accumulators or disengages them therefrom. The present invention is characterised, in particular, in that the actuating element is configured as a rotary disc, i.e. has a substantially flat extension. In addition, a cam controller is provided on the side of the rotary disc that faces the housing, i.e. a portion of the rotary disc that on rotation sweeps a surface of the housing or of a possible intermediate element. In this regard, the cam control acts on the interlocking means in such a way that the energy accumulators can be switched via the interlocking means individually or in combination, as desired, irrespective of whether the cam control is carried out by active engagement of the interlocking means with the energy accumulators or, conversely, by release of the engagement.

The actuating element according to the invention has the advantage that it can be disposed in almost any desired position on the housing and thus increases the freedom of the design of the housing. Furthermore, the actuating element is much smaller than the central actuating ring from the prior art, thus advantageously reducing weight and material costs. Nor does the actuating element account for a significant part of the overall height of the tripod head, thus allowing said tripod head to be overall more compact in its configuration.

Advantageously, the rotary disc has a circular shape, i.e. it is rotationally symmetrical, thus allowing turning of the actuating element, i.e. switching from a top setting, in which all of the energy accumulators are switched on, to a bottom setting, in which the least number of energy accumulators are switched on. There is no need to turn the actuating element back via the intermediate stages.

According to a preferred embodiment, the rotary disc has a plurality of first control cams which are set apart from one another equidistantly along the circumference and switch one of the energy accumulators in alternation on actuation of the rotary disc, i.e. on turning. This is particularly advantageous if there are provided at least three energy accumulators, of which one provides the first spring force and the other two each provide a second spring force which is, for example, twice as great as the first spring force. As a result of the configuration of the first control cams along the circumference of the rotary disc, the energy accumulator is alternately switched with the first spring force, so it is alternately in operative connection between the housing and shaft and out of operative connection between the housing and shaft. Preferably, the first control cams are disposed along the outer circumference, i.e. in proximity to the outer circumference, of the disc.

In the latter embodiment, in particular, it is preferable for the rotary disc further to have a second control cam which gradually widens in the circumferential direction from the centre toward the outside and successively switches each energy accumulator on actuation of the rotary disc. In this regard, the individual stages of the second control cam can be configured integrally or so as to be separated by, for example, webs or depressions. With regard to the foregoing discussion, the second control cam switches in each case the energy accumulators with the second spring force. This allows a respective intermediate stage to be provided. In other words, the energy accumulator is alternately switched on or off with the first spring force and gradually an energy accumulator is switched back with the second spring force whenever the energy accumulator is switched off with the first spring force. Alternatively, however, it is also conceivable for the first control cam 51 to have a width which decreases in the circumferential direction from inside to outside.

On the other hand, it is also conceivable to provide only the second control cam which then in each case gradually switches the individual energy accumulators or else, with regard to the foregoing discussion, a rotary disc in which individual first control cams which are offset in the radial direction are disposed concentrically along the circumference, wherein the control cams located further outward in the radial direction switch one of the energy accumulators and the control cams located further inward switch another energy accumulator. This allows the energy accumulators to be switched individually. At one location or a plurality of locations, two first control cams can then, viewed radially, be disposed parallel in an outer and an inner position so that the energy accumulators are switched in combination. Obviously, it is also possible for more than three energy accumulators to be switched. Depending on the design of the rotary disc, as many energy accumulators as desired can be switched, and this is a further advantage of the invention.

As will be clear from the foregoing discussion, a combination consisting of first control cams along the circumference in only one row on a circular path along the outer circumference with the second control cam is preferable because the provision of energy accumulators, one of which has a different spring force from the others, allows switching to be carried out in smaller stages.

According to a further embodiment of the present invention, the interlocking means of the compensating means comprise a respective spring which presses the interlocking means into the switching position, the cam controller of the rotary disc selectively releasing the interlocking means from the switching position. In other words, the spring force of the spring brings the interlocking means into engagement with the energy accumulators and the cams release this engagement, i.e. the interlocking means are 'pulled', out of the switching position. This leads to the advantage that, in contrast to the above-described prior art, the tolerances do not have to be selected so as to be so small, as during the release of the engagement between the cam controller and the interlocking means, which can be carried out directly or indirectly (see below), the interlocking means slides in a spring-loaded manner on the outer face of the energy accumulator, for example the outer ring of the torsion spring, and, during a swivelling movement of the device at a time at which the interlocking means is aligned with an engagement portion of the energy accumulator, for example a depression, enters into engagement therewith. This allows the costs of manufacturing the tripod head according to the invention to be further reduced and defective products to be avoided.

Furthermore, energy accumulators are preferably used in the form of the above-described torsion springs which can have a very small width of about 2 mm. In order to be able to switch even such narrow energy accumulators, it is preferable if the interlocking means of the compensating means are each formed by a pivotable lever. This lever is preferably configured as a punched part and is therefore beneficially manufactured and can, in contrast to a locking pin, be very narrow in its configuration. It is in this regard particularly preferable if the pivotable levers of the individual interlocking means sit on a common shaft which is supported in the housing.

The cam controller of the rotary disc can act directly or indirectly on the pivotable levers.

According to one embodiment, the levers have a respective projection which is preferably configured integrally with the levers and protrudes through a, preferably elongate, opening in the housing. The elongate opening is provided in a region of the housing that is swept by the side of the rotary disc that is provided with the cam controller. This allows the cam controller of the rotary disc to be brought directly into engagement with the projections of the levers in order to actuate said levers and to release the operative connection.

Alternatively, however, it is also possible to provide rams which are linearly displaceable in the housing and protrude through openings in the housing, the cam controller entering into engagement with these rams and the rams, in turn, actuating the levers.

The levers are preferably acted on by coil springs, leg springs and/or a leaf spring packet in the direction of the switching position (engagement between the lever and energy accumulator).

Alternatively, however, it is also conceivable to configure the present invention in such a way that the cam controller actively presses the interlocking elements into the switching position. In order nevertheless to achieve the advantage of the tolerances, it is in this case however preferable for the interlocking means themselves to be resilient in their configuration. In other words, if they strike an outer face of the energy accumulator during switching, they recoil and automatically lock in engagement with the depression if they are aligned therewith. In the case of the configuration as a lever (see below), the lever could be formed in two parts with an interposed spring element or else from a resilient material. In the case of the configuration as an interlocking pin, it is conceivable to configure the interlocking pin, for example, telescopically, a spring being interposed.

According to a further preferred embodiment of the present invention, there is provided for the at least two energy accumulators a stationary energy accumulator which is at all times operatively connected between the housing and shaft, so that the shaft exerts a basic restoring moment on the receptacle in accordance with the torque of the device, wherein, if none of the at least two energy accumulators is switched, only this basic restoring moment is active.

In addition, it is preferable if the rotary disc is provided with a rotary knob to facilitate handling of the actuating element. The rotary knob can advantageously have a scale which indicates the correspondingly active switching.

BRIEF DESCRIPTION OF THE DRAWINGS

Further features and advantages of the present invention will, in addition, become apparent from the following description of a preferred embodiment given with reference to the appended drawings, in which.

DETAILED DESCRIPTION

Figure 1:
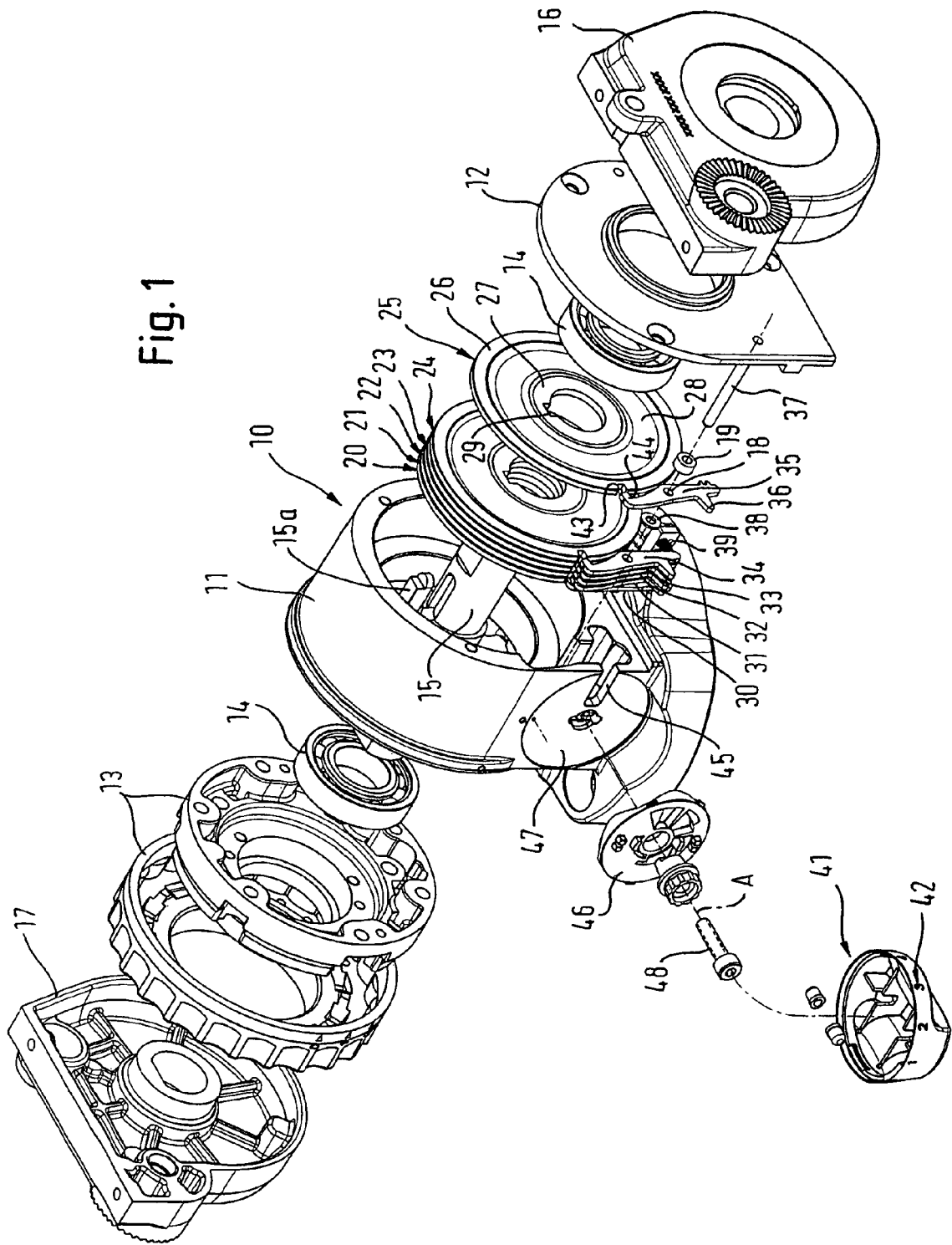
FIG. 1 is an exploded view of a tripod head according to a first embodiment of the present invention.

The tripod head shown in FIG. 1 comprises a housing 10 which is composed of a housing body 11, a cover 12 and damping elements 13 which do not form part of the subject-matter of the present invention. A shaft 15 is rotatably mounted in the housing 10 via ball bearings 14. Attached to the shaft are at both ends elements 16, 17 which are U-shaped in cross section and form the receptacle for a device to be attached, in particular a film or television camera. In addition, further elements may be provided, although these do not form part of the subject-matter of the present invention and will therefore not have to be described in greater detail.

In addition, the tripod head 10 has a plurality of energy accumulators, in the present case six energy accumulators 20-25. The energy accumulators are configured as torsion springs comprising an inner ring 27, an outer ring 26 and a resilient material 28, in particular a rubber, disposed therebetween. The inner ring 27 comprises a recess 29 with which a lug 15a provided on the shaft 15 engages in order non-rotatably to fix the inner ring 27 on the shaft. In other words, the energy accumulators 20-25 are non-rotatably attached to the shaft 15 by pushing the inner rings 27 onto the shaft 15 in the orientation of the depression 29 toward the lug 15a (tongue-and-groove connection). With regard to the configuration of the energy accumulators 20-25, a person skilled in the art may refer for the sake of simplicity to DE 30 26 379 A1.

A lever 30-35 is associated with each of the energy accumulators 20-25, the levers sitting on a common shaft 37 which is supported in the housing 10. In other words, the levers 30-35 are threaded on the shaft 37 via an opening 18 and set apart from one another via spacers 19 and 38 and oriented accordingly toward the respective energy accumulators 20-25.

The energy accumulator 20 is a stationary energy accumulator and the lever 30, which is associated with the energy accumulator 20, is at all times engaged with the corresponding depression 43 in the energy accumulator 20. In the illustrated embodiment, this is carried out by a coil compression spring 39 which presses the engagement element 44 of the lever 30 into the depression 43 about the shaft 37. In contrast to the remaining levers 31-35, the lever 30 does not have an integrally configured projection 36. The projection 36 of the other levers 31-35 is used to switch the further energy accumulators 21-25 by means of the rotary disc 46 which will be described hereinafter in greater detail. Via the coil springs 39, the levers 31-35 are, like the lever 30, acted on at all times in the switching position, i.e. the levers are acted on about the shaft 37 relative to the outer ring 26 or in engagement with the depression 43. In the mounted state, the projections 36 configured on the levers 31-35 protrude outward through an elongate opening 45 formed in the housing body 11. In this regard, the elongate opening 45 is provided in a region of the housing body 11 that is swept by the portion of the rotary disc 46 that is provided with the cam controller (see below). This region is denoted by reference numeral 47 and indicated schematically on the housing body 11.

In the illustrated embodiment, the rotary disc 46 is a circular disc which is rotatable about an axis of rotation A. The rotary disc 46 is actuated via a rotary knob 41 which is connected thereto and comprises a scale 42 which indicates the switching position. In this regard, the rotary knob 41 is fastened to the rotary disc 46 on the side of the rotary disc 46 that is remote from the housing body 11. The rotary disc 46 is rotatably fastened to the housing body 11 and the rotary knob 41 is fastened to the rotary disc 46 in each case via fastening elements 48 (screw and/or clip connection).

Figure 2:
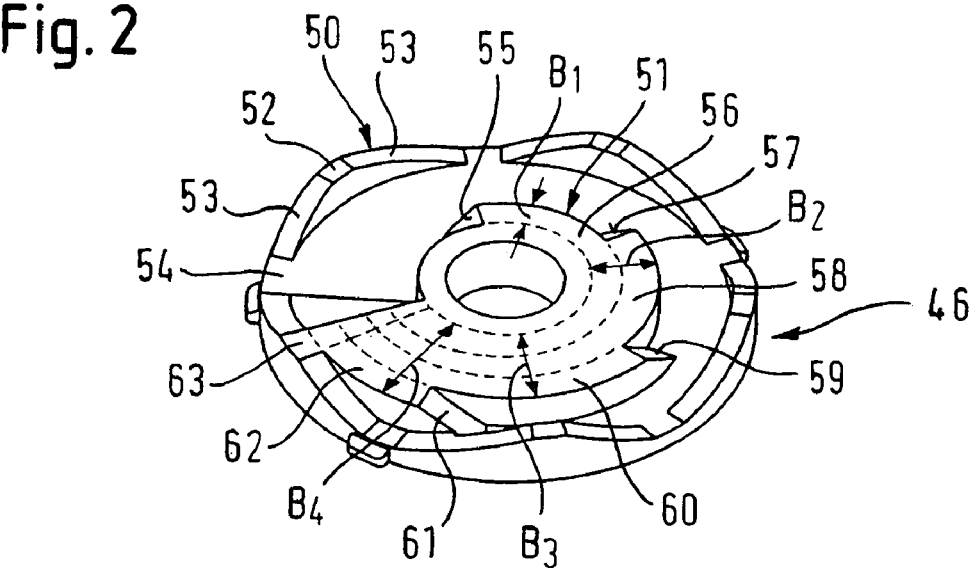
FIG. 2 is a perspective view of the side of the rotary disc that is provided with the cam controller.

As may be seen most clearly from the perspective view of the rotary disc 46 in FIG. 2, which shows the side of the rotary disc 46 that faces the housing body 11, the rotary disc 46 comprises a plurality of first control cams 50 and a second control cam 51.

The first control cams 50 are disposed equidistantly in a row along the circumference of the rotary disc 46 in proximity to or on the outer circumference. They are each formed by an actuating portion 52 and two inclined ramp portions 53 connected thereto. A respective switching portion 54 is disposed between the individual ramp portions 53.

The second control cam 51 has a width which increases from inside to outside in the circumferential direction of the rotary disc 46. The second control cam 51 is configured in one piece and is formed by a first ramp 55 which is connected to a first actuating portion 56, a second ramp 57 which is connected to a second actuating portion 58, a third ramp 59 which is connected to a third actuating portion 60 and a fourth ramp 61 which is connected to a fourth actuating portion 62. In the first actuating portion 56, the second control cam 51 has a width B1. In the region of the second actuating portion 53, there is obtained a width B2 which is composed of the width B1 of the first actuating portion 56 and the width of the second actuating portion 58. In the region of the third actuating portion 60, the width of the second control cam 51 is the width B3 which is composed of the width B2 and the width of the third actuating portion 60. Finally, the width B4 in the region of the fourth actuating region 62 is the width B3 plus the width of the fourth actuating portion 62. In this regard, the width B4>B3>B2>B1. Furthermore, the actuating portion 56 is disposed closest to the centre axis A of the rotary disc 46 (see FIG. 1) and the actuating region 62 is disposed furthest away from this axis, i.e. closest to the outer circumference.

In addition, there is obtained in an end region of the actuating portion 62 a portion 63 in which the surface of the first control cam 50, i.e. the actuating portion 52 of the first control cam 50, and the actuating portions 56, 58, 60 and 62 of the second control cam 51 combine to form an actuating face 63 extending continuously from the outer circumference toward the centre.

The energy accumulator 25 is an energy accumulator having a first spring force which is less than the spring force (second spring force) of the energy accumulators 20-24.

The operation of the device according to the invention will be described hereinafter with reference to FIGS. 1 and 2.

In the switching position '1', only the energy accumulator 20, i.e. the stationary energy accumulator 20, is in operative connection between the shaft 15 and the housing 10 or the housing body 11. In this switching position, the actuating face 63 of the rotary disc 46 is oriented toward the elongate opening 45. The actuating face 63, which extends continuously inward from the outer circumference and is formed by one of the first control cams 50 or the actuating portion 52 thereof and the actuating face 56, 58, 60, 62 of the second control cam 51, pivots the levers 31-35 about the shaft 37 via the projections 36 against the spring force of the coil spring 39. As a result, the engagement portion 44 of the individual levers 31-35 is disengaged from the respective depression 43 in the energy accumulators 21-25. Accordingly, the energy accumulators 21-25 are not in operative connection between the shaft and housing and thus do not contribute to the production of a restoring moment when the device and thus the receptacle and the shaft are pivoted.

From stage '1', the rotary disc 46 is rotated anticlockwise into stage '2' via the rotary knob 41. During this movement, the projection 36 of the lever 35, which is associated with the energy accumulator 25 having the first spring force, slides along the ramp 53 up to the switching portion 54 of the first control cam 50, i.e. from an outermost portion of the actuating face 63 to the switching portion 54 along a ramp 53. In this state, the actuating portion having the width B4 (actuating portions 56, 58, 60, 62) of the second control cam 51 presses on the projections 36 of the levers 31-34 of the energy accumulators 21-24, so said energy accumulators are still not in operative connection between the shaft 15 and housing 10. The energy accumulator 25, on the other hand, is switched on, as the engagement between the projection 36 and the first control cam 50, i.e. the actuating portion 52 or 63 thereof, has been released. In this state, the lever pivots, with simultaneous movement of the projection 36 along the ramp 53, about the shaft 37 and is pressed by the spring 39 against the outer face of the outer ring 26 until its engagement portion 44 engages with the depression 43 in the energy accumulator 25 (on alignment of the depression and engagement portion) and switches the energy accumulator 25 in operative connection between the shaft 15 and housing 10.

In stage '3', the projection 36 of the lever 35 slides upward along the ramp 53 of one of the first control cams 50 to one of the actuating portions 52, as a result of which the lever 35 of the energy accumulator 25 having the first spring force is pivoted out of engagement with the energy accumulator 25. During this anticlockwise rotational movement of the rotary disc 46, the projection 36 of the lever 34 of the energy accumulator 24 having the second spring force slides downward along the ramp 61, thus allowing the lever 34 to pivot about the shaft 37 (owing to the spring force of the spring 39). As a result of this pivoting movement, the engagement portion 44 of the lever 34, when oriented appropriately, enters into engagement with the depression 43 in the energy accumulator 24, so this energy accumulator 24 is switched in operative connection between the shaft 15 and housing 10. In this stage, stage '3', the energy accumulator 24 having the first spring force and the stationary energy accumulator 20 are accordingly active. The energy accumulator 25 having the first spring force is not switched in operative connection.

In the next stage, stage '4', the projection 36 of the lever 35 of the energy accumulator 25 having the first spring force slides back downward along the ramp 53 to a switching portion 54 so, in accordance with the foregoing discussion, the energy accumulator 25 is switched again and thus enters into operative connection between the shaft 15 and housing 10. In addition, the projections 36 of the levers 31-33 slide on the actuating face which is formed by the actuating portions 56, 58, 60 of the second control cam 51 so that the levers remain in an unpivoted state and the energy accumulators 21-23 are not switched in operative connection. Accordingly, the energy accumulators 25, the stationary energy accumulator 20 and the energy accumulator 24 are operatively connected.

In the next stage, stage '5', the energy accumulator 23 is, in accordance with the foregoing discussion, switched on and the energy accumulator 25 removed or switched off. In stage '6', the energy accumulator 25 is switched back on. In stage '7', the energy accumulator 25 is removed again and the energy accumulator 22 switched on before the energy accumulator 25 is in turn switched on (stage '8'). In stage '9', the energy accumulator 25 is removed again and the energy accumulator 21 is switched on; in stage '10', the energy accumulator 25 is in turn switched on, wherein in stage '10' all of the energy accumulators 20-25 are operatively connected and the maximum setting has been reached.

It will be understood that any desired number of energy accumulators may be provided as a function of the design of the rotary disc 46, i.e. the solution of the present invention is very flexible and is not limited to a specific number of energy accumulators.

In addition, there may theoretically also be provided a plurality of energy accumulators having differing spring forces and a plurality of first control cams 50 provided in parallel on circular rings disposed concentrically with one another.

Figure 3:
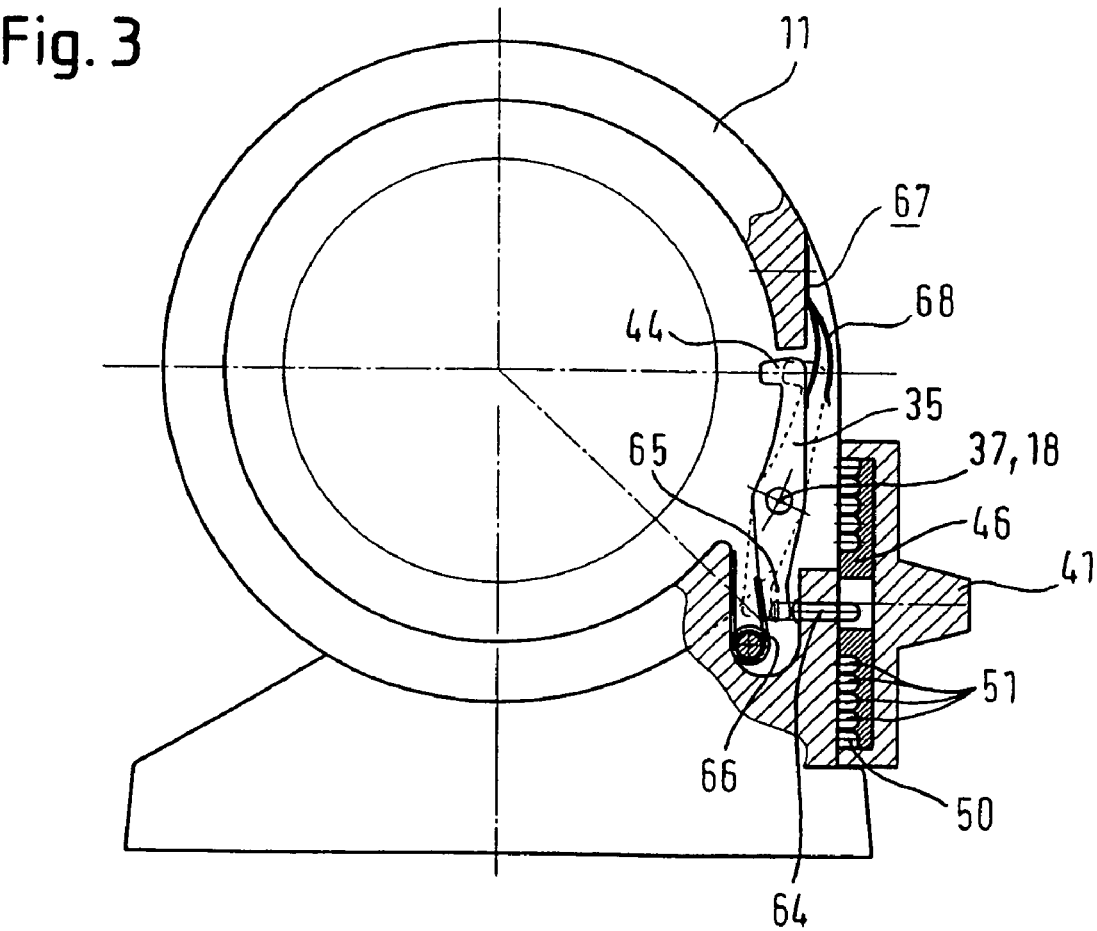
FIG. 3 is a cross section of a tripod head according to an alternative embodiment of the present invention.

An alternative embodiment of the present invention will be described hereinafter with reference to FIG. 3. In FIG. 3, identical or similar elements are denoted by the same reference numerals. Furthermore, in order to avoid repetition, like elements will not be redescribed.

The embodiment in FIG. 3 differs, on the one hand, in that the levers (the lever 35 is shown by way of example) do not have any projection 36 configured in one piece. Provided instead is a ram 64 which is guided linearly in the housing and associated with each lever 35. In other words, the ram 64 is guided linearly in the housing body 11 (for example in a hole corresponding to its cross section) and enters into contact with a lower end 65 of the respective lever 35. As in the embodiment in FIG. 1, the levers 35 are urged by a coil spring 39 into the switching position, i.e. into engagement between the engagement element 44 and the depression 43 (see FIG. 1). However, in contrast to FIG. 1, use is made of a leg spring 66 and/or a leaf spring packet 67. The leaf spring packet 67 is configured in one piece and has a plurality of spring elements 68 which are disposed parallel to one another, set apart from one another over an interval and associated with the respective levers 35 or the upper ends thereof (in a region of the engagement portion 44). With regard to the leg springs 66, a spring of this type is, as in the use of the coil springs 39 in FIG. 1, associated with each lever 35.

The first control cams 50 and the second control cam 51 act on the individual rams 64 of the embodiment in FIG. 3 in order indirectly to actuate the levers. For this purpose, the individual rams protrude in each case from their guide for the surface which is swept by the cam controller.

Alternatively to the configuration of the control cams such as they are shown in FIG. 2, the first control cams 50 can be configured in a peripheral groove (FIG. 3), the depth of which increases and decreases in an undulating manner, in order to form the corresponding actuating portions 52 and switching portions 54 in FIG. 2. Equally, the second control cam 51 can be configured by a plurality of grooves which extend concentrically and parallel, are separated by webs and in which the ramps 55, 57, 59, 61 from FIG. 2 are accordingly connected, from a lowest point of the corresponding grooves, to the corresponding actuating portions 56, 58, 60, 62, which are the highest points of the grooves, so there is also formed, when the grooves are viewed in combination, a second control cam 51 which widens in the circumferential direction from the centre outward, i.e. the actuating face of which widens. In other words, the actuating face 63 does not have to extend continuously from the inside to the outside. Reference is made in this regard to the discussion of FIG. 2.

It will be understood that the rotary disc 46, such as it is shown in FIG. 3, can also be used in the embodiment in FIG. 1. Equally, it will be understood that the combination of the rotary disc 46 from FIGS. 1 and 2 with the rams 64 from FIG. 3 is also conceivable. The same also applies to the swapping-over of the springs 39, 66, 67 from FIGS. 1 and 3.

In addition, it will be understood that a broad range of modifications and alterations are possible within the scope of the invention such as it is defined in the claims. For example, the positioning of the rotary disc 46 is not restricted to the positioning shown and it would also be conceivable, when transferred accordingly, to position the rotary disc 46 at one of the end faces of the housing body 11 or else in a different position along the outer circumference of the at least partially cylindrical basic element 11. Furthermore, it is obviously also conceivable to use a solution other than the lever solution and, for example, to use only the rams 64 from FIG. 3, said rams being brought in this case into engagement, i.e. into the switching position, with the corresponding energy accumulators 21-25 by means of the actuating portions of the individual cams 50, 51. However, it is in this regard preferable for the rams 64 themselves to be resilient in their configuration, i.e. to be formed from a resilient material or else to be flexible in the manner of a telescope, a spring being interposed. They can then slide, in the corresponding position on the outer ring 26 of the energy accumulators 21-25, until the rams 64 are oriented in relation to the depression 43 accordingly and engagement takes place, in this case owing to the spring force of the ram 64.

Furthermore, it is also conceivable to provide further elements between the rotary disc 46 and the interlocking elements, although it is preferable to implement a direct action of the cam controller on the interlocking elements as in FIG. 1, as this greatly reduces the number of parts, with the advantage of a reduction in weight and cost and of simplification of assembly.

The invention claimed is:

1. Tripod head for pivotably receiving a film or television camera device, comprising a housing, a shaft which is rotatably mounted in the housing, a receptacle which is connected to the shaft, at least two separate energy accumulators which are respectively disposed between the shaft and the housing, and a compensating means device comprising a respective interlocking means for the energy accumulators in order to switch the energy accumulators, in each case in operative connection between the housing and shaft, so that a restoring moment is exerted on the receptacle via the shaft in accordance with the torque of the device, and a common actuating element in order to switch the energy accumulators via the interlocking means individually or in combination, as desired, wherein the actuating element is configured as a rotary disc and comprises a cam controller on the side facing the housing, the cam controller acting on the interlocking means in such a way that the energy accumulators can be switched via the interlocking means individually or in combination, as desired, wherein the rotary disc is provided with a rotary knob which serves as a handle for the actuating element.

2. Tripod head according to claim 1, wherein the rotary disc has a circular shape.

3. Tripod head according to claim 1, wherein the rotary disc comprises a plurality of first control cams which are set apart from one another equidistantly along the circumference and switch one of the energy accumulators in alternation on actuation of the rotary disc.

4. Tripod head according to claim 1, wherein the rotary disc comprises a second control cam which gradually widens or narrows in the circumferential direction from the centre toward the outside and successively switches each energy accumulator on actuation of the rotary disc.

5. Tripod head according to claim 1, wherein the interlocking means of the compensating device comprise a respective spring which presses the interlocking means into the switching position, the cam controller of the rotary disc selectively releasing the interlocking means from the switching position.

6. Tripod head according to claim 1, wherein the interlocking means of the compensating device are each formed by a pivotable lever.

7. Tripod head according to claim 6, wherein each lever comprises a respective projection which protrudes through a, preferably elongate, opening in the housing, which opening is formed in a region which is swept by the side of the rotary disc that is provided with the cam controller, and can be brought into engagement with the cam controller of the rotary disc.

8. Tripod head according to claim 6, wherein there is provided between each lever and the cam controller, a ram which is linearly displaceable in the housing and protrudes through an opening in the housing, which opening is formed in a region which is swept by the side of the rotary disc that is provided with the cam controller, and can be brought into engagement with the cam controller of the rotary disc.

9. Tripod head according to claim 1, wherein there is provided a stationary energy accumulator which is at all times operatively connected between the housing and shaft, so that a basic restoring moment is exerted on the receptacle via the shaft in accordance with the torque of the device.

* * * * *

UNITED STATES PATENT AND TRADEMARK OFFICE
CERTIFICATE OF CORRECTION

| | | |
|---|---|---|
| PATENT NO. | : 7,878,465 B2 | Page 1 of 1 |
| APPLICATION NO. | : 12/080988 | |
| DATED | : February 1, 2011 | |
| INVENTOR(S) | : Leonhard Jaumann et al. | |

It is certified that error appears in the above-identified patent and that said Letters Patent is hereby corrected as shown below:

At column 10, claim 1, line 7, the term "means" should be deleted.

Signed and Sealed this
Fifteenth Day of March, 2011

David J. Kappos
*Director of the United States Patent and Trademark Office*